United States Patent [19]

Fabiano et al.

[11] Patent Number: 5,654,458

[45] Date of Patent: Aug. 5, 1997

[54] RECOVERY OF PALLADIUM

[75] Inventors: Michael D. Fabiano, San Francisco, Calif.; Gary A. Kordosky, Tucson, Ariz.; Phillip L. Mattison; Michael J. Virnig, both of Santa Rosa, Calif.; Bert Gruber, Bedburg, Germany; Steven M. Hoagland, Lawrenceville, N.J.

[73] Assignee: Henkel Corporation, Plymouth Meeting, Pa.

[21] Appl. No.: 50,433

[22] PCT Filed: Nov. 14, 1990

[86] PCT No.: PCT/US90/06662

§ 371 Date: May 14, 1993

§ 102(e) Date: May 14, 1993

[87] PCT Pub. No.: WO92/08813

PCT Pub. Date: May 29, 1992

[51] Int. Cl.$^6$ ...................................... C07F 15/00
[52] U.S. Cl. ........................ 556/136; 556/137; 564/256; 75/711
[58] Field of Search ........................... 564/256, 136, 564/137; 75/711

[56] References Cited

U.S. PATENT DOCUMENTS

| | | | |
|---|---|---|---|
| 4,331,634 | 5/1982 | Shanton et al. | 423/22 |
| 4,578,250 | 3/1986 | Dimmit et al. | 423/22 |

FOREIGN PATENT DOCUMENTS

| | | |
|---|---|---|
| 61-238927 | 10/1986 | Japan. |
| 63-014825 | 1/1988 | Japan. |
| 63-020423 | 1/1988 | Japan. |

OTHER PUBLICATIONS

"Solvent Extraction of Palladium (II) with Nonchelating Oximes with Different Alkyl Chain Lengths", Baba et al., Ind. Eng. Chem. Res., 29 2111–8, 1990.

*Primary Examiner*—Paul F. Shaver
*Attorney, Agent, or Firm*—Ernest G. Szoke; Wayne C. Jaeschke; Patrick J. Span

[57] ABSTRACT

Improvement on the recovery of palladium from aqueous acidic solutions employing ketoximes, including novel ether oximes and palladium complexes, comprising contacting the aqueous acidic solution containing the palladium with an organic solvent containing the oxime to form two immiscible phases, separating the organic and aqueous acidic phases and stripping the palladium values from the organic phase using an aqueous ammonia solution. The organic phase may contain phase transfer agents and modifiers.

14 Claims, No Drawings

5,654,458

RECOVERY OF PALLADIUM

BACKGROUND OF THE INVENTION

This application is a 371 of PCT/US90/06662, filed Nov. 14, 1990.

1. Field of the Invention

This invention relates to a process for recovery of palladium from aqueous acidic solutions containing palladium by a solvent extraction process and to reagents employed in the process.

2. Statement of Related Art

During the recovery of precious metals from ore or scrap including spent catalysts, the use of solvent extraction to separate the precious metals from one another and from base metals that may also be present is becoming more widespread. The hydrometallurgical processes employed for the separation and recovery of the platinum group metals (PGMs), e.g. platinum, palladium and rhodium, typically involve dissolving the metal values by some type of oxidative acidic chloride leach, typically with aqua regia or $HCl/Cl_2$ followed by solvent extraction.

The recovery of palladium from aqueous acidic solutions in the past is also described in U.S. Pat. Nos. 4,331,634 and 4,578,250. In each of these patents, a process is described in which an aqueous acidic solution, originally acidic or one which may be obtained by adjusting the pH to render it acidic, is contacted with an organic phase comprised of an organic solvent containing an hydroxyoxime or etheroxime extractant. The organic phase is substantially immiscible with the aqueous acidic solution. After all, or a part, of the palladium is extracted from the aqueous acidic solution to the organic phase, the aqueous and organic phases are separated due to their immiscibility. The palladium now present in the organic phase in association with the oxime is then stripped from the organic phase by a second aqueous solution.

The stripping solution employed in the U.S. Pat. No. 4,331,634 is a strongly acidic solution, such as solutions of sulfuric, hydrochloric, perchloric or nitric acids. The organic phase in this patent may also contain an anionic phase transfer material or catalyst to aid in the extraction of the palladium from the original acidic solution. In the U.S. Pat. No. 4,331,634, the oximes employed as extractants for the palladium are hydroxyoximes.

In the U.S. Pat. No. 4,578,250, the stripping solution is an aqueous ammonia solution. The U.S. Pat. No. 4,578,250 utilizes oxime extractants, similar to those of the U.S. Pat. No. 4,331,634 patent, but which are however ether oximes in which the hydroxy group of the oximes of the U.S. Pat. No. 4,331,634 are converted to ether groups. In the U.S. Pat. No. 4,578,250, p-substituted phenol is employed to ensure ortho-acylation. The patent states "p-acylation yields material which does not selectively form a complex with the divalent palladium, and which is generally less stable under use conditions." No phase transfer materials are employed in this patent.

Another process for recovering palladium by extraction using an aldoxime, RHC=NOH, can be seen in Japanese Patent Application 61-238,927, laid open Oct. 24, 1986. Similarly, in "Solvent Extraction of Palladium (II) with Nonchelating Oximes with Diffferent Alkyl Chain Lengths", Yoshinari Baba, Katsutashi Inoue, Kazuharu Yoshizuka and Takashi Furusawa, Ind. Eng. Chem. Res., 29, 2111–8, 1990, there is described the use of non-chelating oximes such as dodecanal oxime, decanal oxime, octanal oxime and hexanal oxime. In Japanese Patent Applications 63-014,825 and 63-020,423, laid open on Jan. 22, 1988 and Jan. 28, 1988 respectively, the use of aliphatic oximes, such as 2-ethylhexanal oxime, as an accelerator is described in extractions employing phosphate or sulfidic extraction reagents.

DESCRIPTION OF THE INVENTION AND PREFERRED EMBODIMENTS

Other than in the operating examples, or where otherwise indicated, all numbers expressing quantities of ingredients or reaction conditions used herein are to be understood as modified in all instances by the word "about".

Certain improvements over the processes of the past have now been discovered. With respect to the two patents discussed in the preceding section, each of these teach the need for phenolic functionality, either hydroxyl or the corresponding ether, ortho to the oxime functionality. It has been discovered that the ortho-phenolic functionality is not required for the palladium extraction and non-phenolic ketoximes, such as the simple phenone oximes may be employed as extractants for the palladium, and the palladium can be stripped from the organic phase containing the oxime using aqueous ammonia. While not necessary for the extraction, addition of small amounts of amine, such as a quaternary amine will provide improved extraction kinetics. Further, depending on the particular ketoxime, addition of modifiers, such as tridecanol, can be employed to ensure adequate solubility of the palladium complex in the organic solvent phase. The ketoximes employed are particularly selective for palladium. This represents one aspect of the improvement in the process, the details of which will be further discussed hereinafter.

A second aspect of the improvements of the present invention lies in improvement in the process represented by U.S. Pat. No. 4,331,634 earlier discussed, in which hydroxy oximes are employed as extractants for the palladium. This patent teaches the addition of anionic phase transfer catalysts to provide improved extraction performance from HCl aqueous solutions. However, applicants have discovered that when ether oximes as in U.S. Pat. No. 4,578,250 are employed with such anionic phase transfer catalysts, no benefit in stripping of the oximes is observed when the stripping is carried out with aqueous acid as taught by the U.S. Pat. No. 4,331,634. It has also been discovered that when aqueous ammoniacal solutions are employed to strip the ether oxime organic phase, the presence of an anionic transfer catalyst, such as a quaternary amine, in the organic phase, surprisingly improves the kinetics of stripping. This is a second aspect of the present invention.

Still another aspect of the present invention, is the discovery of novel ether oxime extractants for the extraction of palladium. These new ether oxime extractants, which may be used in place of the oxime extractants of the past processes, or in the process improvements of the present invention, as discussed above, are prepared by a process involving telomerization of a conjugated alkadiene with alcohols, such as a phenolic aldehyde, in the presence of a palladium catalyst to provide an ether, followed by oximation of the ether to the corresponding oxime. The resulting ether oxime may contain an alkadienyl group ortho to the phenolic ether functionality. Dependent on the starting phenol, the ring may be substituted with other groups.

With respect to the improvement first described above, the preferred non-phenolic oximes, which are non-chelating oximes, useful for extracting palladium (II) chloride from aqueous hydrochloric acid feed, are those having the formula:

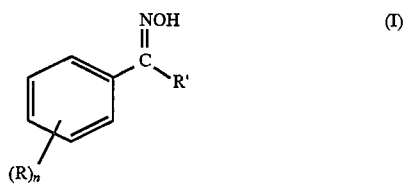

where R is a hydrocarbon, preferably aliphatic, such as an alkyl group, or halogen (preferably Cl), or a meta- or para-alkoxy group, and n is an integer of 0 to 5 and R' is hydrogen or an aliphatic, aromatic, or aliphatic hydrocarbon substituted aromatic group, and when aliphatic may be unsubstituted, or substituted with hydroxy, alkoxy ($C_1$ to $C_4$), ester ($C_1$ to $C_4$), or nitrile substituents. R' is preferably an alkyl group or an alkyl substituted aromatic group (such as phenyl). The groups R and R' may be branched or straight chain, saturated or unsaturated. The ketoximes preferably have a total number of carbon atoms in the range of about 7 to about 26 carbon atoms, with 12 to 26 being most preferred. The ketoximes employed are substantially water insoluble and soluble in organic solvents, such as the aliphatic or aromatic hydrocarbon solvents described later herein. Dependent on the particular ketoxime employed, the addition of a modifier, such as an alkanol, i.e. tridecanol, may be employed to ensure adequate solubility of the palladium complex in the organic phase. Mixtures of the higher molecular weight ketoximes, those having a total number of carbon atoms of 14 or more, with lower molecular weight ketoximes or aldoximes (where R' is H) having a total number of carbon atoms from about 7 to 12 demonstrate improved extraction and stripping kinetics. The lower molecular weight ketoximes or aldoximes act as a kinetic additive or modifier enabling one to take advantage of the better hydrolytic stability of the higher molecular weight ketoximes without a decrease in extraction kinetics and without loss of selectivity. The ketoximes described above are very selective for palladium. In addition, other kinetic additives or modifiers may be employed along with the ketoxime in the organic phase to result in improved kinetics. Such kinetic additives or catalysts, which find particular utility with the use of the ether oximes in the second embodiment or aspect of the present invention described earlier above, are the anionic phase transfer catalysts, such as the fatty or long chain quaternary ammonium, phosphonium or sulfonium compounds. These onium transfer catalysts will be discussed in more detail hereinafter.

The first improvement embodiment of the invention is accordingly an improvement in a process of recovering palladium from an aqueous acidic solution containing said palladium, comprising the steps of (a) contacting said acidic aqueous solution containing said palladium, with a water insoluble oxime compound dissolved in a water insoluble and immiscible organic solvent to transfer the palladium values to the organic phase immiscible with the aqueous solution;

(b) separating the immiscible organic phase from the aqueous phase;

(c) contacting the organic phase with an aqueous ammonia solution whereby the palladium values are removed, extracted or stripped from said organic phase into said aqueous ammonia solution;

(d) separating said organic phase from said aqueous ammonia solution phase; and (e) recovering the palladium values from said aqueous ammonia solution;

the improvement wherein said oxime compound in said organic solvent is a ketoxime having the formula:

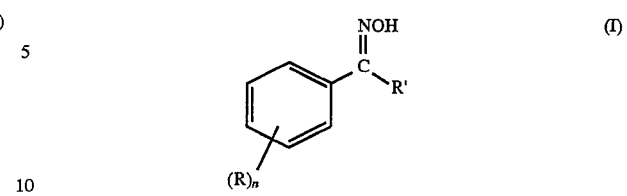

where R, R' and n are as described above, and said aqueous stripping solution is an aqueous ammoniacal solution. Optionally, an aqueous wash step may be conducted after step (b) if necessary or desirable to eliminate or reduce any entrained acid or chloride prior to the aqueous ammonia solution stripping in step (c).

In the second improvement embodiment of the invention, the process steps are the same as in the first embodiment described, however, the oxime extractant dissolved in the organic solvent is a water insoluble ether oxime of the formula II:

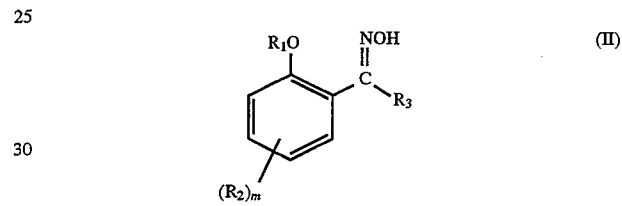

where $R_1$ is a saturated or unsaturated hydrocarbon group, which may be straight or branched chain, preferably an alkyl, cycloalkyl or aralkyl group. $R_2$ is the same as R as described in formula (I), m is an integer of 0 to 4, $R_3$ is the same as R' as described in formula (I), and when $R_1$ is other than unsaturated, an anionic phase transfer agent or a low molecular weight oxime is required to be employed in the organic phase along with the oxime extractant and said aqueous stripping solution is an aqueous ammoniacal solution. When $R_1$ is, or both $R_1$ and $R_2$ are, an unsaturated alkyl group, such as an alkadienyl group, an anionic phase transfer agent is not necessary to be employed, but may also optionally be employed. The total number of carbon atoms in the groups $R_1$, $R_2$ and $R_3$ should be at least 8 up to about 30, with 8 to 24 being preferred. Preferably $R_2$ is an alkyl or alkadienyl group having from 8 to 16 carbon atoms, such as nonyl, dodecyl or octadienyl, $R_1$ is an alkyl group having 1 to 16 carbon atoms or an alkadienyl group having 8 to 16 carbon atoms and $R_3$ is H or an alkyl group having 1 to 4 carbon atoms, preferably 1 or 2 carbon atoms. As in the first embodiment, mixtures of higher molecular weight oximes, those having a total number of carbon atoms of 14 or more, with lower molecular weight ketoximes or aldoximes having a total of 7 to 12 carbon atoms, may be employed.

In the third embodiment of the present invention, novel ether oxime compounds useful in the extraction of palladium are provided. Such novel ether oxime compounds are those having the formula above, but wherein $R_1$, or both $R_1$ and $R_2$ are unsaturated aliphatic hydrocarbon groups, such as octadienyl groups. These novel ether oximes may be represented more clearly by the formula:

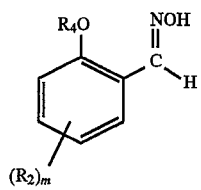

(III)

where $R_2$ is defined as above and m is preferably 1 and $R_4$ is an alkadienyl group preferably containing from 8 to 16 carbon atoms. One of the preferred novel ether oximes is one in which $R_2$ is the same as $R_4$ and is in an ortho relationship relative to the ether $R_4O$ group, which can be ideally represented by the formula:

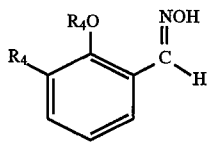

(IV)

where $R_4$ is as defined above. $R_4$ is preferably octadienyl in the novel ether oximes of the present invention embodiment.

These novel ether oximes are prepared by oximation of the corresponding ethers, which are in turn prepared by the 1,3-butadiene telomerization of the corresponding alcohols in the presence of palladium catalysts, such as palladium acetylacetonate, along with a phosphorus catalyst, such as a trialkyl or triaryl phosphine or phosphite. The details of the preparation of such ethers which are oximated, can be seen from copending U.S. application Ser. No. 07/517,990 filed May 2, 1990, which in turn is a continuation-in-part application of U.S. application Ser. No. 07/347,096 filed May 3, 1989. As described therein a conjugated diene is telomerized with an alcohol to form dienyl ethers in high yields in the presence of low levels of a palladium catalyst. The amount of catalyst is a function of the amount of conjugated diene which, expressed as the mole ratio of catalyst to diene is in the range of 1:5000 to about 1:150,000, preferably from 1:25,000 to 1:75,000. As noted, a phosphine or phosphite cocatalyst is generally employed along with the palladium catalyst. For the purposes of this invention, the alcohol employed is a phenolic aldehyde, including substituted phenolic aldehydes, preferably mono- and di-alkyl phenolic aldehydes in which the alkyl groups, branched or linear, saturated or unsaturated, contain up to 24 carbon atoms, preferably 8 to 12 carbon atoms. The phenolic aldehyde may also be substituted with other groups, such as nitro or halogen. The conjugated dienes that are employed in the reaction include the branched or straight chain aliphatic conjugated dienes containing from 4 to 20 carbon atoms, such as 1,3-butadiene, dimethylbutadiene, 1,3-hexadiene, 2,4-hexadiene and 2,4-octadiene, with 1,3-butadiene being preferred. In the reaction the ratio of phenol reactant to conjugated diene is preferably about two moles of diene per mole of alcohol functionality in the phenol. While palladium acetylacetonate [Pd(acac)$_2$] is the preferred palladium catalyst, bis(allyl) or bis(cyclooctadiene) palladium, and palladium chloride or acetate may be employed. Among the phosphine or phosphite catalysts, triethyl, tributyl or triphenyl phosphine and trimethyl, triethyl or triphenyl phosphite are employed. the most preferred catalysts systems are complexes of acetylcetonate of Pd(II), palladium (II) acetate, or palladium(II) chloride with two equivalents of triphenyl phosphine as a ligand and tetrakis (triphenylphosphine) palladium. The reaction is carried out in an autoclave under pressure at a temperature of 40°–100° C., preferably 60°–80° C. for about 5 to 15 hours. In the commonly assigned application the preparation of the octadienyl ethers of salicylaldehyde is exemplified in Example 7 thereof, the disclosure of which is hereby incorporated by reference.

For the present invention, the salicylaldehyde telomer products, O-octadienyl-salicylaldehyde ether telomers are then oximated employing conventional oximation procedures employing hydroxylamine salts, such as the sulfate or hydrochloride generally described in the related art patent discussed earlier above, using a slight excess (1.05–1.15 equivalents) of the hydroxylamine salt to oximate the carbonyl functionality of the ether product.

In the present invention, novel complexes of certain oximes with palladium (II) chloride are also possible. Such complexes will also find utility in applications such as palladium-selective electrodes.

As described earlier above, the first step of the process comprises extraction of the palladium from an aqueous acidic solution containing the palladium values by contact with an organic phase, which is water insoluble and immiscible, so that the aqueous and organic phases may be physically separated. While ideally the phases are mutually insoluble and immiscible in each other, as a practical matter the phases are substantially insoluble and immiscible, and must be so to the extent necessary to be physically separable, one from the other.

The organic phase is comprised of an organic solvent, water insoluble and immiscible as discussed above, which contains a solvent soluble oxime capable of extracting palladium from the aqueous acidic feed solution. The oximes employed must be more soluble in the organic phase than in the aqueous phase and in this sense are considered water insoluble, as used herein.

As indicated, the oxime is dissolved in a water immiscible organic solvent which comprises the extractant phase into which the palladium is extracted or transferred from the aqueous acidic feed solution.

Any substantially water immiscible liquid solvent can be used for solution of the oxime. Typically the solvents are the aliphatic and aromatic hydrocarbons. Aliphatic hydrocarbons such as alkanes, including cycloalkanes, and halogenated alkanes are suitable. Preferred alkanes have a minimum of five carbon atoms. Preferred halogenated alkanes have a minimum of two carbon atoms. Aromatic hydrocarbons which can be used include benzene, and substituted products such as toluenes, xylenes and cumene. Also suitable as solvents are those esters, ethers, ketones and alcohols which are substantially water immiscible. Furthermore, any blend of these substances or a water immiscible kerosene is also suitable. Preferred organic solvents are the aliphatic hydrocarbons having the flash points of 150° F. and higher and solubilities in water of less than 0.1% by weight. These solvents are chemically inert and the costs thereof are currently within a practical range. Representative commercially available solvents are: Kermac 470B (an aliphatic kerosene available from Kerr-Mcgee, Flash Point, 175° F.); Kermac 400–500, an aliphatic kerosene similar to Kermac 470B having a Flash Point of 180° F.; Chevron Ion Exchange Solvent (available from Standard Oil of California), Flash Point, 195° F.; Escaid 100 and 110 (available from Exxon-Europe, Flash Point, 180° F.); Exxsol D 80, available from Exxon USA corresponds to Escaid 100; Norpar 12 (available from Exxon USA, Flash Point, 160° F.); Aromatic 150 (an aromatic kerosene available from Exxon USA, Flash Point, 150° F.); Conoco C 1214L (available from Conoco, Flash Point, 160° F.) and various other kerosenes and petroleum fractions from other oil companies.

Modifiers can be added to the solvent in addition to the extractant in order to modify or improve the extraction of the palladium. Substances which are preferred as modifiers are alcohols, straight or branched chain, having from about 10 to 30 carbon atoms, phenols such as the alkyl (8 to 12 carbon atoms) substituted phenols, and branched chain esters containing from 10 to 30 carbon atoms, which can be added to improve extraction, phase separation and/or other important characteristics of the organic solution. When typically employed in the extraction step, the modifier, such as tridecanol will be employed in amounts up to about 18% in the organic solution.

The amount of oxime in the organic phase is not critical and may vary between wide limits. However, the oxime will be present in an amount of 2–75% by weight of the organic phase, preferably about 5–20%. On a volume basis this will generally be between 1–50%, preferably 5–15%. The concentration should be sufficient to extract the palladium values from the aqueous phase and accordingly the ratio of oxime to metal concentration of at least 2:1 on a molar basis will be employed. However, ratios of less than 2:1 may be employed if it is desired to maximize the palldium loading on the organic phase.

The process will generally be conducted at ambient temperatures and pressures. However, elevated pressures and temperatures may be employed. As a practical matter a temperature of 10°–50° C. will produce satisfactory results.

The respective volumes of the aqueous and organic phases in the various extraction and stripping steps are generally determined by the individual needs of the systems, such as the type of system and equipment employed, and the relative concentration of the solutions. The organic (O) to aqueous (A) volume ratios can acceptably vary from 1:20 to 20:1. More desirably, an effective range of organic to aqueous (O/A) is 1:5 to 5:1 and commercial systems will preferably employ a ratio of 1:3 to 3:1.

The process contemplates a continuous, countercurrent process in which the organic is recycled for reuse. The process may however be carried out as a batch process.

The organic extractant phase should contact the aqueous metal containing phase for a sufficient length of time to permit entry or transfer of the extracted metal into the organic phase. The time of contact depends on the particular system, the type of equipment used, and upon individual needs and desires. As a general rule however, the contact time between the organic extractant solution and the aqueous solution should be in excess of 0.1 seconds with some equipment, but generally less than 3 hours. Naturally a minimum contact time is desired, thus a more desirable phase contact time would be in the range of from 5 seconds to 2 hours, while a more preferred contact time is from about 5 seconds to about 1 hour.

After the metal has been extracted or transferred to the organic phase, the two phases are separated by any convenient means for a liquid/liquid phase separation. Representative, but non-exhaustive examples of means for achieving phase separations are: gravity settlers and centrifuges. Generally any system used to separate different liquid phases may be used.

The organic extractant phase, now containing the palladium, and after separation from the aqueous acidic phases, is then contacted with an aqueous ammoniacal solution so as to strip the palladium from the organic phase. The stripped organic, after separation from the aqueous stripping solution, now substantially barren of palladium, is then recycled back for reuse in the extraction of fresh aqueous acidic palladium containing feed. The aqueous stripping solution employed in the present improved process is an aqueous ammoniacal solution. The aqueous ammonia stripping solution is preferably at least about 1N in ammonia, but may vary up to about a 10N solution. An aqueous ammonia solution of about 3N to 6N is desirable. The palladium can then be recovered from the aqueous strip solution in a conventional manner, isolating the palladium as the insoluble $Pd(NH_3)_2Cl_2$ salt. Procedures, such as reduction, for converting the salt to pure palladium are well known. The insoluble palladium salt can also be precipitated from the palladium loaded aqueous solution by addition of hydrochloric acid thereto.

As indicated earlier, the use of either certain anionic transfer compounds or low molecular weight oximes in the organic phase provides for an improved process when an aqueous ammonia strip solution is employed. The use of the aqueous acidic strip solution employed in U.S. Pat. No. 4,331,634 requires the recovery of the palladium from the aqueous acidic strip solution by extraction onto a solid ion exchange resin, followed by elution of the palladium from the resin using an ammoniacal solution to give the $Pd(NH_3)_4^{+2}$ complex, which is then precipitated as the $Pd(NH_3)_2Cl_2$ salt by addition of hydrochloric acid. The ether oximes of U.S. Pat. No. 4,578,250 are stripped slowly by ammoniacal solutions, and slowly and incompletely by aqueous acid. By contrast, the present invention allows the palladium to be stripped rapidly and completely from the organic phase directly into an ammoniacal strip solution, without the intermediate steps of aqueous acid strip and ion exchange resin extraction.

The anionic phase transfer compounds or catalysts used in the present invention are the fatty or long chain (8 to 22 carbon atoms) quaternary ammonium, phosphonium and sulfonium compounds. The preferred compounds are the quaternary ammonium compounds.

The quaternary ammonium compounds are those having a total of at least 19 or 21, and preferably 25 carbon atoms, preferably those having a quaternary ammonium ion of the formula

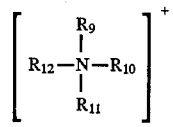

where $R_9$, $R_{10}$, $R_{11}$ and $R_{12}$ individually are aliphatic, araliphatic or aromatic hydrocarbon groups containing from 1 to about 22 carbon atoms and where $R_9$, $R_{10}$, $R_{11}$ and $R_{12}$ together have a minimum of at least 19, and preferably 25, carbon atoms, and where at least three of the four R groups have at least 4 carbon atoms. The anion portion of the quaternary will generally be the chloride or the sulfate. The methyltri ($C_8$–$C_{10}$) ammonium chloride is available commercially from Henkel Corporation as ALIQUAT 336. Other quaternary compounds are derived from tertiary amines containing at least 18 carbon atoms, which have been quaternized in conventional manner so as to contain a methyl group in addition to those contained in the tertiary amines.

Where employed, the anionic phase transfer compounds must also be soluble in the organic phase and insoluble in the aqueous solutions, similar to the oxime extractants. In general compounds having a molecular weight below about 200 will be too soluble in the aqueous solutions and accordingly those compounds having a molecular weight above 200, and preferably above 300 are preferred. The phase transfer agents should ,be present for purposes of the invention at a level of from about 4 mole % up to about 20 mole % relative to the oxime, with the most preferred level being in the range of 7 to 13 mole %.

The improvement of the present invention can best be illustrated by the following examples, which serve to illustrate, but not limit, the invention. All parts and percentages are by weight unless otherwise noted.

In the first set of examples, the recovery of palladium from aqueous acidic chloride solutions with ketoximes is illustrated. The ketoximes employed are n-butyrophenone oxime
2',4'-dimethylacetophenone oxime
isobutyrophenone oxime
p-(n-butyl) isobutyrophenone oxime
p-amylpropiophenone oxime
p-amylisobutyrophenone oxime
p-amyl(2-ethylhexano)phenone oxime
p-dodecylacetophenone oxime
p-dodecylpropiophenone oxime
p-dodecylisobutyrophenone oxime
p-dodecyl(2-ethylhexano)phenone oxime.

The oximes above were prepared from the corresponding ketone or aldehyde by oximation using hydroxylamine hydrochloride.

The following ketones were purchased from Aldrich, and then oximated:

4-Methylpropiophenone
n-Butyrophenone
Isobutyrophenone
2',4'-Dimethylacetophenone and the aldehyde, 2-Ethylhexanaldehyde.

The remaining ketones were prepared by Friedel-Crafts acylation of the alkylbenzene by the acid chloride, using aluminum chloride as catalyst. These ketones include:

p-Dodecylacetophenone
p-Dodecylpropiophenone
p-Dodecylisobutyrophenone
p-Dodecyl(2-ethylhexano)phenone
p-Amylpropiophenone
p-Amylisobutyrophenone
p-Amyl(2-ethylhexano)phenone
p-(n-Butyl)isobutyrophenone.

Other ketones were similarly prepared.

As an example of this preparation, the following procedure describes the synthesis of dodecylpropiophenone, as well as the conversion of the ketone to the oxime.

EXAMPLE A

Preparation of p-Dodecylpropiophenone 96.0 g (0.72 moles) of anhydrous aluminum chloride was added to a 1 L flask equipped with a stirrer, thermometer, and an addition funnel. 250 mL of carbon tetrachloride was added followed by 68.4 g (0.74 moles) of propionyl chloride from a pipette. This reaction mixture was cooled to 5°±3° C. and 153.9 g (0.625 mole) of "soft" dodecylbenzene (Dodane S, produced by Monsanto Chemical Co.) was then added over a 3 hour period while the temperature was maintained at 5°±3° C. The reaction was held at this temperature for an additional hour at which point approximately 500 mL of 10% HCl was slowly added with the temperature kept below 15° C. The reaction mixture was then washed 3 times with 5% HCL, once with water and the solvent stripped under vacuum. The residue was taken up in toluene and washed twice with 5% NaOH, once with water, once with dil. HCl, once with water and then stripped to give 192.0 g of a light brown, fluid oil.

The above product was distilled through a 12" Vigreaux column to give 141.6 g of heart cut boiling at 140°–152° C. at 0.1–0.15 mm. Hg.

Preparation of p-Dodecylpropiophenone Oxime 30.2 g (0.1 mole) of the above ketone, 10.4 g (0.15 mole) of hydroxylamine hydrochloride, 14.8 g of anhydrous sodium acetate, and 50 mL of absolute methanol were combined in a flask equipped with a stirrer and a reflux condenser. The reaction mixture was refluxed for 4 hours, poured into water, extracted into ether, washed 3 times with water, and the solvent stripped to give 31.0 g of light yellow oil. FTIR analysis showed no residual ketone.

Following the same typical procedure described above, the other oximes noted were prepared and evaluated in the extraction of palladium.

EXAMPLE 1

The organic phase was prepared by dissolving sufficient reagent in the indicated solvent system to give a reagent concentration of 0.05M. The aqueous feed solution was prepared by dissolving sodium tetrachloropalladium (II) in 1M hydrochloric acid. Equal volumes of the aqueous feed solution and organic phase were then placed in a separatory funnel and shaken for four hours. The phases were then separated. The aqueous raffinate was then filtered and analyzed along with a sample of the aqueous feed solution for palladium concentration by atomic absorption spectroscopy. The results of Pd extraction with the following reagents are summarized in Table 1 below.

TABLE 1

| | | Pd Extraction | | |
| --- | --- | --- | --- | --- |
| | | | Aq. Pd. Conc. | |
| Reagent | Solvent* | Feed (ppm) | Raff. (ppm) | % Pd Extracted |
| n-Butyrophenone oxime | 100 gpl TDA/Arom 150 | 1960 | 276 | 86 |
| 2',4'-Dimethylacetophenone oxime | 100 gpl TDA/Arom 150 | 1960 | 4 | 99.8 |
| Isobutyrophenone oxime | 100 gpl TDA/Arom 150 | 1960 | 3 | 99.8 |
| p-(n-Butyl)isobutyrophenone oxime | 100 gpl TDA/Arom | 2510 | 965 | 61.5 |

TABLE 1-continued

Pd Extraction

| | | Aq. Pd. Conc. | | |
| --- | --- | --- | --- | --- |
| Reagent | Solvent* | Feed (ppm) | Raff. (ppm) | % Pd Extracted |
| p-(n-Butyl)isobutyrophenone oxime | 15 gpl TDA/Escaid 150 | 2450 | 873 | 64.4 |
| p-Dodecylacetophenone oxime | 100 gpl TDA/Arom 110 | 2480 | 2150 | 13.3 |
| p-Dodecylpropriophenone oxime | 100 gpl TDA/Arom 150 | 2480 | 2120 | 14.5 |
| p-Dodecylpropriophenone oxime | 100 gpl TDA/Arom 150 | 2600 | 1740 | 33.1 |
| p-Dodecyt(2-ethylhexano)phenone oxime | 100 gpl TDA/Arom 150 | 2600 | 913 | 64.9 |
| p-Dodecylisobutyrophenone oxime | 100 gpl TDA/Arom 150 | 2600 | 977 | 62.4 |
| p-Amylpropiophenone oxime | 100 gpl TDA/Arom 150 | 2460 | 1890 | 23.1 |
| p-Amylpropiophenone oxime | 15 gpt TDA/Escaid 110 | 2460 | 1380 | 44.0 |
| p-Amyl(2-ethylhexano)phenone oxime | 100 gpl TDA/Arom 150 | 2430 | 1940 | 20.2 |
| p-Amyl(2-ethylhexano)phenone oxime | 15 gpl TDA/Escaid 110 | 2430 | 1250 | 48.6 |
| p-Amylisobutyrophenone oxime | 15 gpl TDA/Escaid 110 | 2470 | 318 | 87.1 |

TDA = tridecanol
Arom 150 = Aromatic 150 kerosene (Exxon-U.S.A.)

In the following example, stripping of the palladium was evaluated.

EXAMPLE 2

The palladium loaded organic phases, which were prepared in the same fashion as described for Table 1, were contacted with an equal volume of 5M aqueous ammonia by shaking in a separatory funnel for four hours. The phases were then separated. The aqueous raffinate was then filtered and analyzed for palladium concentration by atomic absorption spectroscopy. The results are shown in the following Table 2.

TABLE 2

Pd Stripping

| | | Pd Concentration | | |
| --- | --- | --- | --- | --- |
| Reagent | Solvent | Org Feed (ppm) | Aq. Raff. (ppm) | % Pd Stripped |
| n-Butyrophenone oxime | 100 gpl TDA/Arom 150 | 1684 | 1670 | 99.2 |
| 2',4'-Dimethylacetophenone oxime | 100 gpl TDA/Arom 150 | 1956 | 1920 | 98.2 |
| Isobutyrophenone oxime | 100 gpl TDA/Arom 150 | 1957 | 1930 | 98.6 |
| p-(n-Butyl)isobutyrophenone oxime | 15 gpl TDA/Escaid 110 | 1577 | 1240 | 78.6 |
| p-Dodecylacetophenone oxime | 100 gpl TDA/Arom 150 | 330 | 247 | 74.8 |
| p-Dodecylpropriophenone oxime | 100 gpl TDA/Arom 150 | 360 | 351 | 97.5 |
| p-Dodecyl(2-ethylhexano)phenone oxime | 100 gpl TDA/Arom 150 | 1200 | 1180 | 98.3 |

EXAMPLE 3

In this example, palladium selectivity is illustrated.

TABLE 3

Pd Selectivity

| Reagent | Aq. Soln. | Pd (ppm) | Pt (ppm) | Cu (ppm) | Fe (ppm) | Ni (ppm) |
| --- | --- | --- | --- | --- | --- | --- |
| 1. p-Dodecylpropiophenone oxime | Feed | 888 | 2060 | 2320 | 2230 | 2150 |
|  | Raff. | 647 | 2060 | 2290 | 2210 | 2130 |
| 2. p-Dodecylisobutyrophenone oxime | Feed | 888 | 2060 | 2320 | 2230 | 2150 |
|  | Raff. | 579 | 2040 | 2310 | 2250 | 2150 |
| 3. p-Dodecyl(2-ethylhexano)- phenone oxime | Feed | 888 | 2060 | 2320 | 2230 | 2150 |
|  | Raff. | 585 | 2050 | 2310 | 2250 | 2150 |
| 4. p-(n-Butyl)isobutyrophenone oxime | Feed | 872 | 1810 | 2290 | 2240 | 2180 |
|  | Raff. | 256 | 1770 | 2270 | 2220 | 2190 |
| 5. p-(n-Butyl)isobutyrophenone oxime | Feed | 1070 | 2340 | 2130 | 2130 | — |
|  | Raff. | 1.9 | 2330 | 2110 | 2140 | — |

The experiments summarized in Table 3 were carried out in the following fashion: A solution of the reagent 0.05M in either Aromatic 150 containing 100 gpl tridecanol (Examples 1–4) or Escaid 110 containing 15 gpl tridecanol (Example 5) was contacted with an aqueous feed solution containing $Pd^{+2}$, $Pt^{+4}$, $Cu^{+2}$, $Fe^{+3}$, and $Ni^{+2}$ (as chlorides) dissolved in 1M hydrochloric acid at an O/A of 1 by shaking for 4 hrs. The phases were allowed to separate. The aqueous raffinate phase was then filtered and analyzed along with a sample of the aqueous feed solution for individual metal concentrations by atomic absorption spectroscopy.

EXAMPLE 4

In this example, the effect of a quaternary ammonium compound, ALIQUAT 336, on palladium extraction using p-(n-butyl)isobutyrophenone oxime was studied, with the following results.

TABLE 4

Effect of Aliquat 336 Concentration on Pd Extraction by p-(n-Butyl)isobutyrophenone Oxime

| Aliquat 336 Conc. | Aq. Feed (ppm) | Aq. Raff. (ppm) | % Pd Extracted |
| --- | --- | --- | --- |
| 0 | 2450 | 873 | 64.4 |
| 0.002M | 2450 | 7.1 | 99.7 |
| 0.005M | 2450 | 4.4 | 99.8 |

The experiments summarized in Table 4 were carried out in the following fashion: Organic solutions were prepared containing different levels of Aliquat 336 in a 0.05M solution of the oxime in Escaid 110 containing 15 gpl tridecanol. The extractions were then performed in the same fashion as previously described for the experiments summarized in Table 1 with the exception that contact times were only 15 minutes.

EXAMPLE 5

In this example, the effect of the same quaternary ammonium compound above on palladium selectivity using the same oxime above, was studied with the following results.

TABLE 5

Effect of Alliquat 336 on Pd Selectivity by p-(n-Butyl)isobutyrophenone Oxime

| Aliquat 336 Conc. (M) | Aqueous Raffinate Metal Concentration | | | |
| --- | --- | --- | --- | --- |
| | Pd (ppm) | Pt (ppm) | Cu (ppm) | Fe (ppm) |
| 0 | 1.9 | 2330 | 2110 | 2140 |
| 0.002 M | 0.6 | 2190 | 2120 | 2130 |
| 0.005 M | 0.5 | 1830 | 2110 | 2110 |
| Aqueous Feed | 1070 | 2340 | 2130 | 2130 |

The experiments summarized in Table 5 were carried out in the following fashion: Differing amounts of Aliquat 336 were dissolved in a 0.05M solution of the oxime in Escaid 110 containing 15 gpl tridecanol to give Aliquat 336 concentrations of 0.002M and 0.005M. The experiments were then carried out in the same fashion as previously described for the experiments summarized in Table 3.

The foregoing examples illustrate that palladium(II) chloride can be extracted by contacting an aqueous hydrochloric acid feed solution with an organic phase consisting of a ketoxime dissolved in a kerosene, e.g., Escaid 110, a largely aliphatic kerosene, or Aromatic 150, a largely aromatic kerosene (see Table 1). Addition of a solvent modifier, such as tridecanol, to the kerosene insures adequate solubility of the palladium complex in the organic phase. The palladium can then be recovered from the organic phase by stripping with aqueous ammonia (see Table 2). The ketoximes are very selective for palladium as evidenced by the data in Table 3. Addition of small amounts of a quaternary amine such as Aliquat 336 to the organic phase result in improved extraction kinetics as can be seen from the data in Table 4. The use of a quaternary amine to improve the extraction kinetics leads to some loss in selectivity for Pd over Pt as can be seen in Table 5. However, selectivity for palladium over platinum is still excellent, despite conditions which favor low selectivity, i.e, the presence of about twice as much platinum as palladium, and the use of a large excess of oxime reagent over palladium.

The foregoing examples also illustrate that a phenolic hydroxyl or ether functionality ortho to the oxime functionality is not required as taught in U.S. Pat. No. 4,578,250 and that ketoximes of the formula

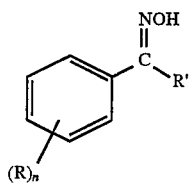

may be employed in the recovery of palladium, where R, R' and n are as previously defined.

Improved extraction kinetics are achieved by the use of a mixture of higher molecular weight ketoximes or aldoximes and lower molecular weight oximes. The lower molecular weight oximes must be sufficiently high in molecular weight so that they are not overly soluble in the aqueous phase and lost; however, they must also be low enough in molecular weight to possess significant surface activity. Monofunctional ketoximes and aldoximes having 6–12 carbon atoms represent lower molecular weight oximes having the desired blend of properties for use with higher molecular weight ketoximes having a total of 14 or more carbon atoms.

In the earlier discussion of the use of mixtures of higher and lower molecular weight oximes, those lower molecular weight ketoximes and aldoximes, corresponding to the Formulae (I) and (II), were included, which contain an aromatic ring. However, it is to be understood that suitable lower molecular weight oximes, which may be employed if they meet the solubility requirements discussed, also include the aliphatic ketoximes and aldoximes containing 6–12 carbon atoms, in which the aliphatic group may be straight or branched chain, saturated or unsaturated, hydrocarbon, unsubstituted or substituted with groups which do not adversely affect the solubility requirements. The following example serves to illustrate the use of a mixture of lower molecular weight oximes and higher molecular weight ketoximes.

EXAMPLE 6

Organic solutions were prepared containing 0.05 mM of dodecylpropriophenone oxime and either 0.0 or 0.005 mM of either 2-ethylhexanaldoxime or 4-methylpropriophenone oxime in Escaid 110 containing 100 gpl of tridecanol.

A 125 ml portion of a 1M HCl solution containing 2430 ppm of palladium(II) was placed in a plexiglas mixer box 3.6 inches high by 2.5 inches (i.d.) square. The mixing impeller (1.5 inches in diameter) was then positioned just above the surface of the aqueous phase and 125 ml of the organic phase was poured carefully onto the surface of the aqueous phase in such a way as to minimize pre-mixing of the phases. The stirrer, which had been preset at 2000 rpm, was then started and 15 ml samples of the emulsion were removed at 5, 15, 30, 60, and 120 minutes. The samples were placed in a separatory funnel and the phases were allowed to separate. The aqueous phase was then filtered and analyzed by atomic absorption spectroscopy for palladium content. The results are summarized in the attached Table 6.

TABLE 6

Summary of Palladium Extraction Kinetics by Dodecylpropiophenone Oxime

| | Kinetic Modifier | | |
|---|---|---|---|
| Time (min) | None [Pd] org. (ppm) | 2-Ethyl- hexanaldoxime [Pd] org. (ppm) | 4-Methyl- propiophenione oxime [Pd] org. (ppm) |
| 5 | 50 | 310 | 130 |
| 15 | 40 | 480 | 360 |
| 30 | 100 | 630 | 630 |
| 60 | 170 | 810 | 800 |
| 120 | 320 | 990 | 1170 |

As noted earlier, U.S. Pat. No. 4,331,634 teaches that addition of an anionic phase transfer material to an organic phase containing an oxime extractant results in an improved process for the extraction of palladium from acidic aqueous solutions and then subsequent stripping with a strong acid solution. In contrast to this work, it was found that while addition of an anionic phase transfer agent, such as Alamine 336 [tri($C_8$–$C_{10}$)amine, available from Henkel Corporation] or Aliquat 336, with ether oximes and certain simple oximes leads to improved extraction performance from aqueous HCl, one sees no benefit in stripping these oximes with aqueous acid. This is very surprising since one would expect the anionic phase transfer agents to improve the reverse reaction also. Even more surprising is the fact that these quaternary ammonium phase transfer agents improve the kinetics of stripping with aqueous ammonia, as shown in example 7 which follows below. Further data illustrating the improvement in extraction and stripping are summarized in the following Examples 8 and 9. Table 9B shows that added tertiary amine gives an initially improved stripping rate, but fails to reach completion. By contrast, added quaternary ammonium compound gives greatly enhanced stripping kinetics as well as complete stripping.

EXAMPLE 7

For comparative stripping tests with aqueous hydrochloric acid and aqueous ammonia, loaded organic solutions were prepared in the following fashion. A 50 mM solution of the oxime in Aromatic 150 Kerosene containing 5 mM of Aliquat 336 and 100 gpl of tridecanol as a phase modifier was contacted with an equal volume of an aqueous hydrochloric acid solution (pH 1.0) containing 2 gpl of palladium by shaking for 2 hrs. After shaking, the phases were allowed to separate. Each phase was then filtered and analyzed by atomic absorption spectroscopy. The loaded organic phases contained approximately 2 gpl of palladium.

The stripping tests were carried out as follows: The aqueous phase (80 ml), either 6N hydrochloric acid or 5M ammonia, was placed in the mixer box described in FIG. 1. An equal volume of a palladium loaded organic solution was then carefully poured on top of the aqueous phase in such a fashion as to avoid disturbing the interphase. The phases were then mixed using an overhead stirrer set at 2000 rpm. Samples were removed at timed intervals while stirring. Each sample was placed in a separatory funnel and allowed to separate. Each phase was then filtered and analyzed by atomic absorption spectroscopy for palladium content.

Tests were carried out with 2-octadienyloxy benzaldoxime (OBO) or 2-methoxy-5-dodecylbenzaldoxime (MDBO). The results are summarized in the following Table.

TABLE 7

Comparison of Stripping with Aqueous HCl and NH₃ in the Presence of Aliquat 336

| Oxime | OBO | | MDBO | |
|---|---|---|---|---|
| Stripping Agent Time (min) | HCl | NH₃ | HCl | NH₃ |
| | % Palladium Stripped | | | |
| 0 | 0.0 | 0.0 | 0.0 | 0.0 |
| 1 | 6.3 | 24.3 | 3.6 | 40.3 |
| 2 | 7.2 | 38.2 | 3.9 | 43.3 |
| 5 | 8.1 | 39.2 | 4.1 | 47.3 |
| 15 | 8.2 | 57.9 | 3.7 | 49.6 |
| 30 | 12.3 | 71.3 | 3.4 | 50.4 |
| 60 | 12.8 | 78.1 | 3.3 | 53.4 |
| 120 | 12.8 | 98.9 | 3.3 | 60.7 |

EXAMPLE 8

Comparative extraction kinetics tests were carried out as follows: A 50 mM solution of the oxime in either Escaid 110 or Aromatic 150 kerosene containing 50–200 gpl of tridecanol as phase modifier was prepared. In experiments involving either Alamine 336 or Aliquat 336, sufficient Alamine 336 or Aliquat 336 was added to the oxime solution to give a concentration of 5 mM of either Alamine 336 or Aliquat 336.

The aqueous palladium feed solution (80 ml), ca 1 gpl Pd in aqueous hydrochloric aid (pH 1.0) was placed in a mixer box (FIG. 1). The organic solution (80 ml) was then carefully poured on top of aqueous phase in such a fashion as to minimize mixing. The phases were then mixed at 2000 rpm using an overhead stirrer and samples were removed at timed intervals. Each sample was placed in a separatory funnel and allowed to separate. Each phase when then filtered and analyzed by atomic absorption spectroscopy for palladium content.

Tests were carried out with 2-octadienyloxybenzaldoxime (OBO) or 2-methoxy-5-dodecylbenzaldoxime (MDBO). The results are summarized in the following Tables.

TABLE 8 A

Kinetics of Pd Extraction for MDBO

| Kinetic Modifier Time (min) | None | Aliquat 336 |
|---|---|---|
| | % Palladium Extracted | |
| 0 | 0 | 0 |
| 1 | 3.4 | 82.3 |
| 2 | 8.5 | 91.9 |
| 5 | 12.7 | 97.0 |
| 15 | 22.1 | 97.7 |
| 30 | 31.0 | 97.7 |
| 60 | 44.9 | 97.7 |
| 120 | 59.9 | 97.7 |

TABLE 8B

Kinetics of Pd Extraction for OBO

| Kinetic Modifier Time (min) | None | Aliquat 336 | Alamine 336 |
|---|---|---|---|
| | | % Palladium Extracted | |
| 0 | 0 | 0 | 0 |
| 1 | 10.2 | 83.3 | 76.6 |

TABLE 8B-continued

Kinetics of Pd Extraction for OBO

| Kinetic Modifier Time (min) | None | Aliquat 336 | Alamine 336 |
|---|---|---|---|
| | | % Palladium Extracted | |
| 2 | 16.4 | 93.9 | 89.5 |
| 5 | 29.0 | 98.1 | 96.1 |
| 15 | 51.3 | 98.3 | 96.1 |
| 30 | 69.2 | 98.3 | 96.1 |
| 60 | 83.5 | 98.3 | 96.1 |
| 120 | 88.3 | 98.3 | 96.1 |

EXAMPLE 9

Comparative stripping kinetics tests were carried out in a similar fashion as to that described in Example 1. In experiments involving either Alamine 336 or Aliquat 336, sufficient Alamine 336 or Aliquat 336 was added to the oxime solution to give a concentration of 5 mM of either Alamine 336 or Aliquat 336. In all cases, the aqueous stripping phase consisted of a 5M ammonia solution.

Tests were carried out with 2-octadienyloxybenzaldoxime (OBO) or 2-methoxy-5-dodecylbenzaldoxime (MDBO).

TABLE 9 A

Kinetics of Pd Stripping for MDBO

| Kinetic Modifier Time (min) | None | Aliquat 336 |
|---|---|---|
| | % Pd Stripped | |
| 0 | 0.0 | 0.0 |
| 1 | 40.5 | 69.5 |
| 2 | 43.3 | 71.4 |
| 5 | 47.3 | 74.1 |
| 15 | 49.6 | 74.5 |
| 30 | 50.4 | 74.5 |
| 60 | 53.4 | 77.3 |
| 120 | 60.7 | 77.3 |

TABLE 9 B

Kinetics of Pd Stripping for OBO

| Kinetic Modifier Time (min) | None | Aliquat 336 | Alamine 336 |
|---|---|---|---|
| | | % Pd Stripped | |
| 0 | 0 | 0 | 0 |
| 1 | 24.3 | 89.8 | 46.8 |
| 2 | 38.2 | 93.8 | — |
| 5 | 39.2 | 93.8 | 63.6 |
| 15 | 57.9 | 94.7 | 63.6 |
| 30 | 71.3 | 95.6 | 63.6 |
| 60 | 78.1 | 97.3 | 66.3 |
| 120 | 98.9 | 100 | 70.5 |

In the standard procedures to obtain ether oximes from acylated phenols, the phenol is alkylated by appropriate alkylating agents such as an alkylhalide as described in U.S. Pat. No. 4,578,250 followed by oximation of the carbonyl portion of the resulting ether. It was found that novel oximes useful in palladium recovery are prepared by oximation of products resulting from the butadiene telomerization reaction to the etherification of phenols as described earlier. The reaction is particularly applicable to the preparation of oximes of octadienyl ethers of salicylaldehyde to provide oximes having the formula

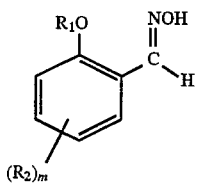

where $R_1$ and $R_2$ and m are as earlier defined. Where $R_1$ and $R_2$ are the same alkadienyl groups, such as octadienyl and m is 1, the resulting product may be represented by the formula

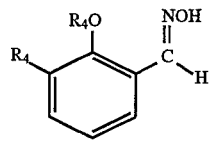

where $R_4$ is an alkadienyl group containing from 8 to 16 carbon atoms, preferably the octadienyl group. When m is 0 the resulting product is

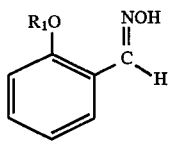

the octadienyloxy ether of salicylaldoxime.

The following example 10 illustrates the preparation of the salicylaldoxime.

EXAMPLE 10

A 75 ml capacity, two-port steel autoclave, containing a magnetic stirring bar and fitted with a pressure gauge, was charged with $Pd(acac)_2$ (30.5 mg, 0.100 mmol), triphenylphosphine (52.5 mg. 0.200 mmol), and salicyl aldehyde (12.2 g, 0.100 mmol). The air in the autoclave was replaced with nitrogen by three pump/purge cycles (evacuation to ≈0.2 torr and bleeding $N_2$ back in to ambient pressure) while the reactants were mixed by stirring. The apparatus was cooled to −70° C. and butadiene (≈17 ml, 240 mmol) was introduced into the autoclave while $N_2$ was swept over the top of the reactants and out of the opening. The autoclave was sealed and the mixture was allowed to warm to ambient temperature before being placed in an oil bath heated to 50° C. The reaction mixture was stirred at this temperature for a period of 12 h. The unreacted butadiene was vented and GC analysis of the crude product showed a product distribution of 19% branched phenol ether, 61% linear phenol ether and 14% telomer products that were formed by reaction with the aldehyde group. Distillation of the telomer product mixture at reduced pressure results in partial Claisen rearrangement of the ether to the ring-alkylated products mentioned above. Part of the crude telomer mixture (15 g) was dissolved in 100 mL of MeOH. Hydroxylamine sulfate (7.8 g, 0.95 mol) and sodium acetate (8.0 g, 0.10 mole) were added to the solution and the mixture was left to stir at ambient temperature overnight. The reaction mixture was poured into 250 mL of water and extracted with 50 mL of 1:4 ether-pentane (two times). The combined organic extracts were washed with brine and dried over $MgSO_4$. Concentration afforded 16.2 g of the crude oxime. The presence of oxime functionality was confirmed by GC·IR analysis.

The crude oxime mixture was tested for palladium extraction properties in the same manner as earlier described and showed an enhanced extraction rate compared to corresponding oximes wherein $R_2$ is nonyl or dodecyl, and $R_1$ is methyl.

We claim:

1. A palladium chloride complex with an ether oxime of the formula

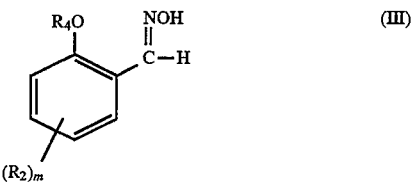

where $R_4$ is an alkadienyl group containing 8 to 16 carbon atoms, $R_2$ is a hydrocarbon group, halogen, or meta- or para-alkoxy group, and m is an integer of 0 to 4.

2. A palladium chloride complex as defined in claim 1, wherein $R_4$ is an alkadienyl group containing 8 to 16 carbon atoms, $R_2$ is $R_4$ or a saturated or unsaturated, straight or branched chain, alkyl, cycloalkyl, aryl, aralkyl, alkoxy, aryloxy, or halogen group, and m is an integer of 0 to 4.

3. A palladium chloride complex as defined in claim 2, wherein $R_4$ is octadienyl and m is 1.

4. A palladium chloride complex as defined in claim 2, wherein $R_4$ and $R_2$ are octadienyl and m is 1.

5. A palladium chloride complex as defined in claim 4 wherein said $R_2$ group is in a position ortho relative to the $R_4O$ group.

6. The palladium chloride complex of 2-octadienyloxybenzaldoxime.

7. A palladium chloride complex of an oxime of the formula

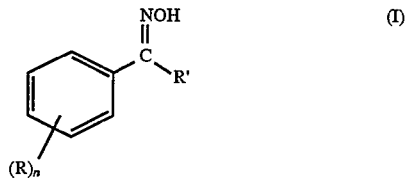

where R is a hydrocarbon group, halogen, or meta- or para-alkoxy group, n is an integer of 0 to 5, and R' is hydrogen, an aliphatic or aromatic hydrocarbon or aliphatic substituted aromatic group, and when aliphatic is unsubstituted or substituted with an hydroxy, alkoxy, ester or nitrile substitutent, and the total number of carbon atoms in said oxime is from 7 to 26.

8. A palladium chloride complex as defined in claim 7 wherein the oxime is selected from the group consisting of p-(n-butyl)isobutyrophenone oxime p-amylpropiophenone oxime p-amylisobutyrophenone oxime p-amyl(2-ethylhexano)phenone oxime p-dodecylpropiophenone oxime p-dodecylisobutyrophenone oxime p-dodecyl(2-ethylhexano)phenone oxime.

9. An ether oxime having the formula

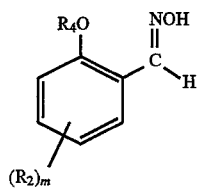

where $R_4$ is an alkadienyl group containing 8 to 16 carbon atoms, $R_2$ is a hydrocarbon group, halogen, or meta- or para-alkoxy group, and m is an integer of 0 to 4.

10. An ether oxime as defined in claim 9 wherein $R_4$ is octadienyl and m is 1.

11. An ether oxime as defined in claim 9 wherein $R_4$ and $R_2$ are octadienyl and m is 1.

12. An ether oxime as defined in claim 11 wherein said $R_2$ group is in a position ortho relative to the $R_4O$ group.

13. 2-Octadienyloxybenzaldoxime.

14. An oxime selected from the group consisting of p-(n-butyl)isobutyrophenone oxime p-amylpropiophenone oxime p-amylisobutyrophenone oxime p-amyl(2-ethylhexano)phenone oxime p-dodecylpropiophenone oxime p-dodecylisobutyrophenone oxime p-dodecyl(2-ethylhexano)phenone oxime.

* * * * *